United States Patent Office 3,360,343
Patented Dec. 26, 1967

3,360,343
LEACHING CALCIUM AND MAGNESIUM IMPURITIES FROM SOLAR SALT USING DILUTE MINERAL ACID
Grant A. Mickelson, Cary, and Gino Baseggio, Crystal Lake, Ill., assignors to Morton International, Inc., a corporation of Delaware
No Drawing. Filed June 8, 1964, Ser. No. 373,557
8 Claims. (Cl. 23—312)

This invention relates to a process for preparing an ultra pure sodium chloride, having an exceptionally low concentration of calcium and magnesium compounds.

As a chemical raw material used to produce other chemicals, sodium chloride, or salt, must meet stringent purity specifications, which specifications vary depending upon the specific chemical process involved. Calcium and magnesium compounds, usually in the form of sulfate and chloride, respectively, are a natural and substantial adjunct of sodium chloride produced by the well known commercial techniques of salt production, including solar evaporation of sea water or brine from inland lakes and evaporation of brines either by open pan or vacuum pan processes. The term "brine" used throughout this specification refers to an aqueous solution of sodium chloride and includes sea water and various natural brines.

In many industrial chemical processes employing sodium chloride, calcium and magnesium impurities are detrimental to the successful operation of the process. For example, in the production of caustic and chlorine by the electrolysis of concentrated brines, it is a prerequisite to successful operation that the sodium chloride employed be entirely free of these undesirable impurities or that they be present in only minor trace concentrations.

In food processing, the effect of calcium on some foodstuffs which are processed by means of salt is also well known. For example, in the case of leguminous vegetables, such as peas and beans, calcium in salt reacts with the pectin present in the vegetable skin, forming calcium pectinate. This results in a toughening of the skin so that a salt low in calcium is required for processing these vegetables. Salt containing conventional amounts of calcium sulfate tends to cause grittiness in butter. A low calcium content in pickling brine is necessary to prevent precipitation of calcium phosphate in those pickling brines to which phosphates are added in the treatment of ham.

The present conventional industrial practice for the removal of calcium and magnesium ions from sodium chloride generally involves dissolving impure sodium chloride to form a brine and thereafter adding various reagents such as sodium carbonate, lime or sodium hydroxide with sufficient agitation of the resulting slurry to precipitate calcium as calcium carbonate and magnesium as magnesium hydroxide. The unwanted precipitates are removed by filtration and discarded. The filtrate, consisting of purified brine, is then subjected to evaporation by either open pan or vacuum pan techniques to produce sodium chloride essentially free of calcium and magnesium. As is readily understood, this chemical technique now in current use involves a plurality of process steps, the use of complicated processing equipment, engineering supervision and considerable labor. Accordingly, it would be desirable to provide a process for producing highly purified sodium chloride without resorting to expensive, laborious and cumbersome dissolution, precipitation and brine evaporation methods.

It is, therefore, an object of the present invention to provide a simplified process for reducing the calcium and magnesium content of salt containing substantial quantities of these impurities to less than about 30 parts per million of calcium, and to less than about 4 parts per million of magnesium.

It is a further object of this invention to provide an improved process for reducing the calcum and magnesium content of crude granular solid salt containing substantial quantities of these impurities to less than 30 parts per million of calcium and to less than 4 parts per million of magnesium, which process obviates the necessity of chemical purification of brine followed by evaporation of the purified brine to produce salt.

A still further object is the provision of a process for producing a purified salt from crude salt obtained by the evaporation of sea water.

The fulfillment of these and other objects of this invention may be more readily appreciated by reference to the following specification, examples and appended claims.

Accordingly, in one broad form, the present invention is a method for reducing the calcium and magnesium in a crude salt produced by concentration of brine which comprises comminuting the crude salt to a particle size of less than about 400 microns, and contacting the comminuted salt particles with an aqueous acid solution of brine, washing and drying the resulting purified salt. The contact time is such as to reduce the calcium content of the salt to 30 parts per million or less and the magnesium to 4 p.p.m. or less.

The process in one preferred embodiment relates to the production of purified salt from sea or solar salt. This process comprises in broad terms the concentration of sea water containing calcium and magnesium impurities, recovering the crystalline salt, and comminuting the same to a particle size of 400 microns or less, contacting the comminuted salt crystals with a dilute acid solution of brine, recovering and washing the purified salt product.

By the process of the present invention, it has been found that moist crude solar salt containing up to 3000 parts per million of calcium and up to 2000 parts per million of magnesium may be purified to the desired degree without resorting to costly and laborious precipitation and evaporation techniques. Although the process of the present invention has been carried out on crude moist solar salt, the method is applicable to other types of moist or undried salt produced by the evaporation of brines. If crude salt containing in excess of 2000 parts per million calcium, for example as calcium sulfate, is used in the process of the present invention, then it is desirable, although not mandatory, to employ a preliminary conventional flotation step prior to beginning the process in order to remove excess adhering external calcium sulfate particles.

It has been found that there is a definite relationship between the particle size of the crude salt and the degree to which purification with respect to calcium and magnesium can be attained in the present process. Crude salt which has been reduced to a particle size less than about 400 microns (40 mesh screen, U.S. Standard sieve series) produces purified salt having less than 30 parts per million of calcium and less than 4 parts per million of magnesium when treated in accordance with the process of the present invention. Conversely, crude salt which has a particle size substantially greater than about 400 microns, does not yield salt of the desired purity in the present process. Specifically, with respect to magnesium contamination, it was also found that a crude salt which had undergone a drying process, either at ambient temperatures or above, and which contained more than about 100 p.p.m. of magnesium, cannot be purified by the present process to the desired magnesium content. Conversely, if the crude salt has not been dried and retains its original moisture, then reduction to less than 4 p.p.m. of magnesium is easily attained by the present process, even where the initial magnesium content is considerably in excess of 100 p.p.m. However, where a crude moist salt, i.e., one which has not been subjected to drying after the crystallization step, containing more than 100 p.p.m. of magnesium, is to be dried before or during the pulverization process, it is necessary to subject the crude moist salt to a pre-wash procedure in which it is soaked or slurried in either water or a brine solution prior to dying, pulverization and teatment with the acid leaching solution. The purpose of the pre-washing procedure in this connection is to reduce the magnesium content to about 100 p.p.m. or less, so that the present process may attain its objective with respect to reduction of magnesium. It is emphasized that this pre-washing technique is required only where the salt contains more than about 100 p.p.m. of magnesium and is to be dried. Drying salt which contains more than about 100 p.p.m. of magnesium "fixes" or "locks" in the magnesium so that a reduction to less than 4 p.p.m. cannot be achieved by the present process.

Among the more commercially important acids which are useful in this invention are hydrochloric acid, sulfuric acid, phosphoric acid, nitric acid and acetic acid. The preferred acid used in this process is a mineral acid. The most preferred mineral acid is hydrochloric.

The minimum concentration of acid operable in the process of the present invention is that concentration which is approximately stoichiometrically equivalent to the sum of the concentration of the calcium and magnesium compounds, in the form of carbonates, oxides and hydroxides present in the salt. Generally from about ½ to 4% by weight of acid gives satisfactory results. However, it was found convenient, using salt containing calcium and magnesium impurities within the above defined limits, to employ a concentration of acid in the range of about one percent by weight of the treating solution. The maximum concentration of acid which is operable in the present process is governed only by the economic impracticability of using treating solutions of concentrated acid where dilute acid solutions are equally effective.

The purity of the resultant product is the same whether acidified water or acidified brine is used as the leaching or treating solution. However, if water is used, due to dissolution of salt and concomitant formation of brine, the yield of purified product is 15 to 20 percent less than when brine solution is used. Therefore the use of a concentrated brine results in a better yield of product because of smaller losses due to solution of the salt in the brine. It is preferred to use an acidified concentrated brine solution as the treating solution to minimize the loss due to dissolution.

The equipment for pulverizing the crude salt to the required state of subdivision may be of any of the conventional types commercially available or combinations of these. Thus, various hammer mills, micropulverizers or ball mills are conveniently employed. The crude salt may be first pulverized and then placed in the acid leaching solution, or the pulverization may be carried out in the presence of the acid leaching solution, as may be conveniently done in a ball mill. If a ball mill is used simultaneously as both the grinding and acid leaching vessel, then it is preferable to use a ceramic lined vessel and ceramic or porcelain type balls to avoid contamination which a metal ball mill or metal balls might otherwise introduce.

With respect to the time of immersion of pulverized salt in the acid treating solution to effect the desired purification, about 30 minutes or less is sufficient to solubilize the contaminants when agitation of the solution is employed. As is readily understood, relatively longer periods of immersion are required when the puverized salt is in contact with the treating solution under quiescent conditions. The present process is conveniently carried out at ambient temperatures, requiring no heating to produce the purified product. Inasmuch as an increase in temperature in general tends to increase the rate of dissolution, increasing the temperature of the resulting salt-treating solution slurry decreases the time required to dissolve the calcium and magnesium impurities.

The ratio of crude salt to treating solution found to be economic in the present invention was found to vary from about three parts by weight of salt to about one part by weight of treating solution down to about one part by weight of salt to about one part by weight of treating solution. Although less than one part of salt to one part of treating solution is operative to produce a purified product, this ratio impairs the economy of the process.

The separated, purified salt can be washed with either water, brine, acidified water or acidified brine. It is preferred to use pure brine for washing since this effectively removes the soluble impurities and dissolves very little of the purified salt.

In the preferred embodiment of the present invention, crude moist solar salt containing approximately 1000 to 2000 parts per million of calcium and approximately 200 to 500 parts per million of magnesium is ground so that the salt passes a 40 mesh screen. One part by weight of the finely divided salt is admixed with one part by weight of a treating solution comprising an aqueous brine solution containing approximately 1 percent by weight of hydrochloric acid calculated as HCl for at least 30 minutes. At the end of this time, the undissolved salt is separated from the treating solution, washed and dried to yield a purified product containing less than 30 parts per million of calcium and less than 4 parts per million of magnesium. This procedure affords a means of effecting a high degree of purification of salt with a minimum of process steps, labor and equipment. It should be understood that sulfate is reduced proportionately and commensurately with the reduction of calcium content, and that it is inherent in this process that other trade impurities present in salt are likewise substantially removed.

For a more complete understanding of the process of the present invention, reference is made to the following specific examples:

EXAMPLE 1

This example illustrates the effect of particle size fractions on the process of the present invention using dried salt.

Three different samples of solar salt, designated A, B and C, are each air dried, then pulverized, then dried further at 50° C. for several days, and thereafter separated into various particle size fractions as follows:

*Sieve (U.S. Standard sieve series):*

−8 +16, −16 +30, −30 +50,
  −50 +100, −100 +200 and −200

Each of these fractions is analyzed for calcium and magnesium content prior to treatment. A 400 gram sample of each of these fractions is mechanically stirred with 400 milliliters of saturated brine containing 1% hydrogen chloride by weight for a period of 2 hours at room temperature (approximately 75° F.). Each portion so treated is then filtered, thoroughly washed with saturated pure brine, dried at 110° C., and analyzed for calcium and magnesium content. The results appear in Table I.

TABLE I

| Fraction (Mesh Size) | Impurity | Sample A Before | Sample A After | Sample B Before | Sample B After | Sample C Before | Sample C After |
|---|---|---|---|---|---|---|---|
| −8 +16 | Calcium | 815 | 265 | 804 | 133 | 744 | 310 |
|  | Magnesium | 383 | 110 | 114 | 47 | 62 | 9 |
| −16 +30 | Calcium | 816 | 119 | 611 | 72 | 616 | 168 |
|  | Magnesium | 483 | 81 | 95 | 35 | 33 | 7 |
| −30 +50 | Calcium | 964 | 44 | 563 | 35 | 493 | 78 |
|  | Magnesium | 617 | 64 | 114 | 26 | 27 | 4 |
| −50 +100 | Calcium | 1,155 | 14 | 602 | 13 | 459 | 26 |
|  | Magnesium | 880 | 51 | 148 | 23 | 28 | 3 |
| −100 +200 | Calcium | 1,565 | 11 | 940 | 10 | 866 | 11 |
|  | Magnesium | 1,269 | 35 | 241 | 13 | 33 | 2 |
| −200 | Calcium | 2,617 | 11 | 1,302 | 8 | 1,212 | 9 |
|  | Magnesium | 1,723 | 27 | 453 | 10 | 58 | 2 |

EXAMPLE 2

Experiment 1

A sample of solar salt is dried for 4 days at 50° C., then pulverized and segregated into particle size fractions of −16 +30, −30 +50, −50 +100, and −100 +200. Each fraction is analyzed for calcium and magnesium content. Four hundred grams of each fraction is separately admixed at ambient temperature for two hours with 400 milliliters of saturated brine prepared from chemically pure sodium chloride, said brine containing 1% by weight of hydrochloric acid. At the end of this time, the solid salt is filtered, washed, dried and analyzed for calcium and magnesium content.

Experiment 2

A second sample of each of the above fractions is treated as in Experiment 1 above with the exception that the time of contact with the acidified brine is 168 hours.

Experiment 3

A third sample of each of the above fractions is treated as in Experiment 1 above with the exception that the temperature of the admixture is maintained at 90° C. The results are set forth in Table II.

TABLE II

| Fraction (Mesh Size) | Impurity | Experiment 1 | Experiment 2 | Experiment 3 |
|---|---|---|---|---|
|  |  | Leaching Time, Hours | | |
|  |  | 2 | 168 | 2 |
|  |  | Temperature, °C. | | |
|  |  | Ambient | Ambient | 90 |
|  |  | Treatment Before | After | After | After |
| −16 +30 | Calcium | 611 | 72 | 49 | 71 |
|  | Magnesium | 95 | 35 | 23 | 27 |
| −30 +50 | Calcium | 563 | 35 | 23 | 39 |
|  | Magnesium | 114 | 26 | 17 | 18 |
| −50 +100 | Calcium | 602 | 13 | 10 | 14 |
|  | Magnesium | 148 | 23 | 10 | 12 |
| −100 +200 | Calcium | 940 | 10 | 4 | 7 |
|  | Magnesium | 241 | 13 | 6 | 7 |

EXAMPLE 3

A 1000 gram sample of moist crude solar salt which contained 718 p.p.m. of calcium and 168 p.p.m. of magnesium is soaked in distilled water for 2 days to reduce magnesium to less than 100 p.p.m., then drained and washed. The sample is then placed in a ball mill containing ceramic cylinders and to it is added 1000 milliliters of a saturated brine solution containing 1% by weight of hydrochloric acid. The resultant slurry is ball-milled for 6 hours, filtered, washed and dried. After drying, the material passing through a 50 mesh screen is separated and analyzed for calcium and magnesium. The results are presented below:

|  | Before Treatment | After Treatment |
|---|---|---|
| Calcium (p.p.m.) | 718 | 5.4 |
| Magnesium (p.p.m.) | 168 | 1.7 |

EXAMPLE 4

A quantity of crude moist solar salt which contains 718 p.p.m. of calcium and 168 p.p.m. of magnesium is given a pre-wash treatment by soaking in an equal quantity of distilled water for one week. At the end of this time, the salt is filtered, washed and dried. The calcium content is reduced to 389 p.p.m. and the magnesium content is reduced to 62 p.p.m. by this treatment. The salt is then pulverized and 700 grams of the portion passing a 50 mesh screen is added to 700 milliliters of distilled water containing 1% hydrochloric acid. The slurry is continuously agitated for 2 hours, then filtered, washed and dried. The calcium content of the dried treated salt is 6.5 p.p.m. and the magnesium content is 1.4 p.p.m.

EXAMPLE 5

Six hundred and sixty grams of a freshly harvested, moist solar salt containing 2825 p.p.m. of calcium and 1578 p.p.m. of magnesium are ground in a ball mill with 1320 grams of a saturated sodium chloride solution containing 1% by weight of hydrochloric acid. The resultant slurry is milled for 4 hours, then filtered, washed with saturated salt solution, dried and analyzed for calcium and magnesium. The calcium content of the treated salt is 14.8 p.p.m. and the magnesium content is 3.5 p.p.m.

EXAMPLE 6

One thousand grams of a sample of moist solar salt which had been stockpiled and exposed to weathering under moist conditions for about one year, is ball milled for about 4 hours with 1000 grams of a saturated sodium chloride solution containing 1% by weight of hydrochloric acid, after which it is filtered, washed and dried. Prior to treatment, the salt contained 884 p.p.m. of calcium and 82 p.p.m. of magnesium. After treatment the salt contains 5.7 p.p.m. of calcium and 0.4 p.p.m. of magnesium.

EXAMPLE 7

One thousand grams of moist solar salt containing 850 p.p.m. of a calcium compound calculated as calcium and 210 p.p.m. of magnesium compound calculated as magnesium are comminuted to a particle size of −50 mesh and then added to one liter of a dilute aqueous solution of hydrochloric acid containing 1% by weight of hydrochloric acid calculated as HCl. The mass is allowed to stand in a covered container for a period of six months under quiescent conditions at ambient (Chicago area) outdoor (June to November) temperature. The above procedure is repeated except that the temperature of the resultant salt-aqueous hydrochloric acid solution is maintained over the six month period at 55° C. At the end of this storage period, the undissolved salt in each instance is separated from the treating solution by filtration followed by washing with distilled water and drying. The results are as follows:

|  | Calcium (p.p.m.) | Magnesium (p.p.m.) |
|---|---|---|
| Before Treatment | 850 | 210 |
| After Treatment at Ambient Temperature | 9.2 | 2.6 |
| After Treatment at 55° C | 0.0 | 0.8 |

EXAMPLE 8

A sample of crude moist solar salt is pulverized to a particle size of −50 mesh. One part by weight of the pulverized salt is immersed in one part by weight of a dilute aqueous solution of hydrochloric acid containing 1% by weight of hydrochloric acid calculated as HCl. The slurry, at a temperature of 75° F., is mechanically agitated for 30 minutes, then filtered and given two displacement washes with distilled water. The resultant filter cake is dried and analyzed for calcium and magnesium.

This process is repeated on two different samples of crude solar salt. The following results are obtained.

|  | Before Treatment | After Treatment |
|---|---|---|
| Sample No. 1: |  |  |
| Calcium (p.p.m.) | 990 | 0 |
| Magnesium (p.p.m.) | 340 | 2 |
| Sample No. 2: |  |  |
| Calcium (p.p.m.) | 716 | 7.0 |
| Magnesium (p.p.m.) | 133 | 2.7 |
| Sample No. 3: |  |  |
| Calcium (p.p.m.) | 850 | 3.7 |
| Magnesium (p.p.m.) | 210 | 2.8 |

EXAMPLE 9

*Experiment 1*

Three hundred grams of crude moist nondried solar salt containing 1021 parts per million of calcium compounds calculated as calcium and 120 parts per million of magnesium compounds calculated as magnesium are pulverized in a ceramic ball mill with 300 milliliters of a saturated sodium chloride brine which contains a quantity of sulfuric acid to make the solution half normal (about 2.5% by weight) with respect to hydrogen ion concentration. The ball-milling is continued for approximately 4½ hours to insure that substantially all the salt particles are reduced to finer than 40 mesh. After this time the salt is filtered, washed and dried.

*Experiment 2*

The procedure in Experiment 1 above is repeated except that phosphoric acid (about 1.6% by weight) is substituted for sulfuric acid.

*Experiment 3*

The procedure in Experiment 1 above is repeated except that nitric acid (about 3 weight percent) is substituted for sulfuric acid.

*Experiment 4*

The procedure in Experiment 1 above is repeated except that acetic acid (about 3 weight percent) is substituted for sulfuric acid.

The data and results are set forth in Table III.

TABLE III

| Acid | Concentration of acid (weight percent) | Content After Treatment | |
|---|---|---|---|
|  |  | Calcium (p.p.m.) | Magnesium (p.p.m.) |
| Sulfuric | 2.5 | 6.2 | 0.3 |
| Phosphoric | 1.6 | 5.0 | 0.5 |
| Nitric | 3.2 | 3.1 | 0.8 |
| Acetic | 3.0 | 3.9 | 0.6 |

With respect to calcium content, Example 1 demonstrates that the reduction in calcium content of crude salt to less than 30 parts per million is achieved in the present process only where the crude salt has been comminuted to a particle size smaller than about 40 mesh.

Where a crude salt has been subjected to a drying process as in Example 2, it is apparent that the magnesium content is not reduced to the desired level of less than 4 p.p.m. even where the salt has been pulverized to finer than 50 mesh and stored in the leaching solution for long periods of time, or at an elevated temperature. In the purification of a salt harvested from a brine concentration process and which is to be subjected to a drying process, a pre-washing or soaking of the undried crude moist salt crystals in water or brine is required prior to the drying step. This expedient is illustrated in Examples 3 and 4. However, where the crude moist salt has not been subjected to a drying process, as in Example 5, then the present process is effective to lower the magnesium content to the desired level even where the magnesium content is as high as 1578 p.p.m. Example 7 illustrates that the reduction of the calcium and magnesium concentration is accomplished under quiescent contact conditions. Example 8 demonstrates that a short contact time such as about 30 minutes with agitation is sufficient to bring about the desired reduction of calcium and magnesium concentrations. Example 9 demonstrates that broad variety of acids, such as sulfuric, phosphoric, nitric and acetic, are operable in the present invention.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. In a process for purifying solar salt obtained by the evaporation of brine, the improvement which comprises separating crude impure crystalline sodium chloride salt from the aqueous brine in a moist, undried condition, containing as impurity compounds calcium in an amount of up to 3000 p.p.m. and magnesium in an amount of up to about 2000 p.p.m. comminuting said impure salt to a particle size of less than about 400 microns, contacting said comminuted impure salt with a dilute aqueous acid selected from the group consisting of hydrochloric, sulfuric, phosphoric, nitric and acetic acids to form a slurry of salt crystals in supernate brine, said dilute acid having a concentration of ½ or more percent and at least a concentration which is stoichiometrically equivalent to the sum of the concentration of the calcium and magnesium compounds in the form of carbonates, oxides and hydroxides present in the impure salt, the dilute acid dissolving said calcium and magnesium impurities while not substantially dissolving the sodium chloride whereby to reduce the calcium and the magnesium content of said salt, and recovering, washing and drying said purified undissolved salt.

2. In a process for purifying solar salt obtained by the concentration of brines, the improvement which comprises comminuting, to a particle size of less than about 400 microns, the crude impure crystalline sodium chloride salt recovered from the aqueous brine in a moist undried condition and containing as impurity compounds calcium in an amount of up to about 3000 p.p.m. and magnesium in an amount of up to about 2000 p.p.m., contacting the moist comminuted salt crystals with from about ½ to about 4 percent dilute aqueous acid selected from the group consisting of hydrochloric, sulfuric, phosphoric, nitric, and acetic acids to form a slurry of solid crystals in supernate aqueous brine to dissolve said calcium and magnesium impurities without dissolving substantially any sodium chloride whereby to reduce the calcium content of said salt to less than about 30 p.p.m. and the magnesium content to less than about 4 p.p.m., recovering said purified salt from said slurry, washing and drying said salt.

3. A process according to claim 2 wherein the acid is hydrochloric acid.

4. The process of claim 2 wherein the comminuting of the moist salt and the contact with dilute acid solution are carried out concomitantly.

5. A process for producing solar salt having a reduced calcium and magnesium content which comprises concentrating sea water to produce crude impure crystalline sodium chloride salt containing as impurity compounds up to about 3000 p.p.m. calcium and up to about 2000 p.p.m. magnesium, harvesting said salt from the aqueous brine in moist condition, comminuting the crystalline sodium chloride salt to a particle size of less than about 400 microns, contacting the resulting moist salt particles with a brine solution acidified with an acid selected from the group consisting of hydrochloric, sulfuric, phosphoric, nitric, and acetic acids, said acidified brine solution having an acid concentration of ½ or more percent and at least a concentration which is stoichiometrically equivalent to the sum of the concentration of the calcium and magnesium compounds present in the impure salt, the dilute acidified brine solution dissolving said calcium and magnesium impurities without dissolving substantially any of the sodium chloride whereby the resulting purified salt has a calcium content of less than 30 p.p.m. and a magnesium content of less than 4 p.p.m. recovering and washing said undissolved purified sodium chloride.

6. The process of claim 5 wherein the comminuting of the moist salt and the contact with dilute acid solution are carried out concomitantly.

7. A process for producing sodium chloride solar salt having a reduced calcium and magnesium content which comprises concentrating an aqueous brine which contains calcium and magnesium impurities to produce a sodium chloride salt containing as an impurity compound more than 100 p.p.m. magnesium, washing the crude moist salt recovered from the concentration of brine with an aqueous brine to reduce the magnesium content to less than 100 p.p.m., drying the crude salt, comminuting the dried crude salt to a particle size of less than about 400 microns, contacting the comminuted salt with a dilute aqueous acid selected from the group consisting of hydrochloric, sulfuric, phosphoric, nitric, and acetic acids to form a slurry of solid salt crystals and supernate acidified brine, said dilute acid having a concentration of ½ or more percent and at least a concentration which is stoichiometrically equivalent to the sum of the concentration of the calcium and magnesium compounds in the form of carbonates, oxides and hydroxides present in the impure salt, the dilute acid dissolving said calcium and magnesium impurities while not substantially dissolving the sodium chloride, recovering undissolved purified salt from said slurry, washing and drying said salt, to produce a salt product having a calcium content of less than 30 p.p.m. and a magnesium content of less than 4 p.p.m. said initially treated salt being characterized as containing no more than 3000 p.p.m. calcium, and no more than 2000 p.p.m. magnesium as impurity compounds.

8. The process of claim 6 wherein the comminuting and acid contacting steps are carried out concomitantly.

References Cited
UNITED STATES PATENTS

| | | | |
|---|---|---|---|
| 2,766,884 | 10/1956 | Marullo | 23—312 X |
| 2,766,885 | 10/1956 | Marullo | 23—39 X |
| 3,008,655 | 11/1961 | Adams | 23—312 |
| 3,101,247 | 8/1963 | Serowy | 23—39 |
| 3,271,106 | 9/1966 | Nylander | 23—121 |

OTHER REFERENCES

Comey and Hahn: Chemical Solubilities, 2nd ed., New York, 1921, pp. 843, 987 and 946.

WILBUR L. BASCOMB, JR., *Primary Examiner.*

S. EMERY, *Assistant Examiner.*